May 29, 1951  J. P. PAINE ET AL  2,554,634
PITOT-STATIC TUBE WITH AIRSTREAM ALIGNING MEANS
Filed Dec. 16, 1947  2 Sheets-Sheet 1

Inventors
JOSEPH P. PAINE,
ORLEN C. ZAHNOW,

By Donald W. Farrington
Attorney

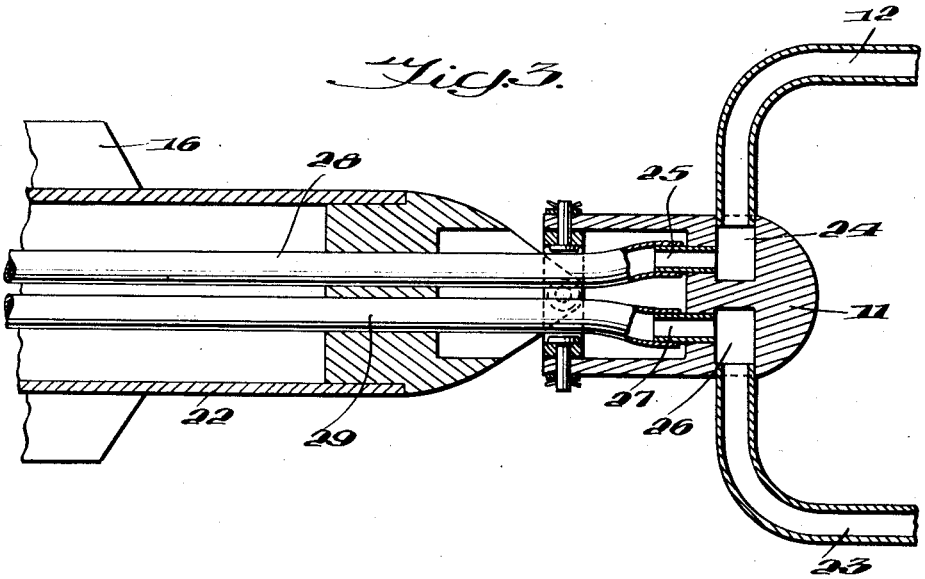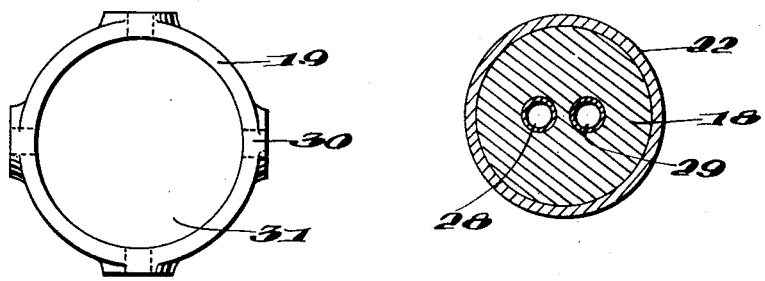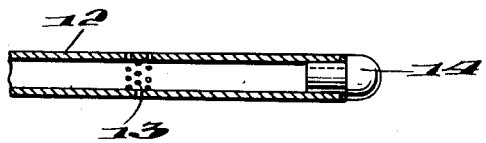

Patented May 29, 1951

2,554,634

UNITED STATES PATENT OFFICE 2,554,634

PITOT-STATIC TUBE WITH AIRSTREAM ALIGNING MEANS

Joseph P. Paine, Baltimore, and Orlen C. Zahnow, Baltimore County, Md., assignors to The Glenn L. Martin Company, Middle River, Md., a corporation of Maryland Application December 16, 1947, Serial No. 792,032

8 Claims. (Cl. 73—212)

Our invention relates to an improved air-speed measuring instrument and more particularly to a flexibly mounted Pitot-static tube capable of self-alignment with a local air stream.

The conventional method of measuring the air speed of an aircraft is by a comparison between the dynamic or impact air pressure, created incidental to movement of the aircraft through the air, and the air at static pressure. The difference in velocity pressure between the pressures of the impact air and the static air is shown by an indicator as miles per hour. However, as the attitude of the aircraft changes during normal flight, or under yaw conditions, the conventional type of Pitot-static tube being incapable of movement presents an angular approach to the air stream which effects local increases in flow velocities over the static orifice as well as effecting pressure differences at the impact orifice due to the change in the angle of attack which, in turn, affects the accuracy of the speed indicator.

This invention overcomes this and similar defects in air-speed measuring devices by providing a novel instrument in which the head of a Pitot-static tube having air-flow vanes is flexibly mounted for alignment with the local air stream to effect transmission of impact and static air pressures to an air-speed indicator unaffected by the attitude of the aircraft.

It is among the objects of our invention to provide a flexible Pitot-static tube suitable for use in measuring air-flow pressures unaffected by changes in the angle of attack or angle of yaw of the aircraft on which it is mounted.

Another object of this invention is to provide an instrument for use in measuring impact and static pressures in the true direction of air flow relative to an aircraft in flight.

A further object is to provide a Pitot-static tube adapted for self-alignment with the local air flow encountered by an aircraft during flight.

A still further object is the provision of a simple construction in a Pitot-static tube mounted for aligned movement in the air stream of an aircraft capable of producing superior accuracy in picking up air pressures for comparative measurement.

Another object is to provide for measurement of free air-stream pressures by means of a flexibly-mounted, vaned Pitot-static tube having openings angularly spaced to minimize shock wave interference.

Other objects of our invention will become apparent from the following description when considered in conjunction with the accompanying drawings in which like numbers refer to like parts in the different views:

In the drawings:

Figure 3 is an enlarged sectional view taken on line 3—3 of Figure 1.

Figure 4 is an enlarged sectional view on line 4—4 of Figure 1.

Figure 5 is an enlarged detailed view of the universal ring.

Figure 6 is an enlarged detailed view of the arrangement of the air inlets and closed end of the static tube.

Figure 1:
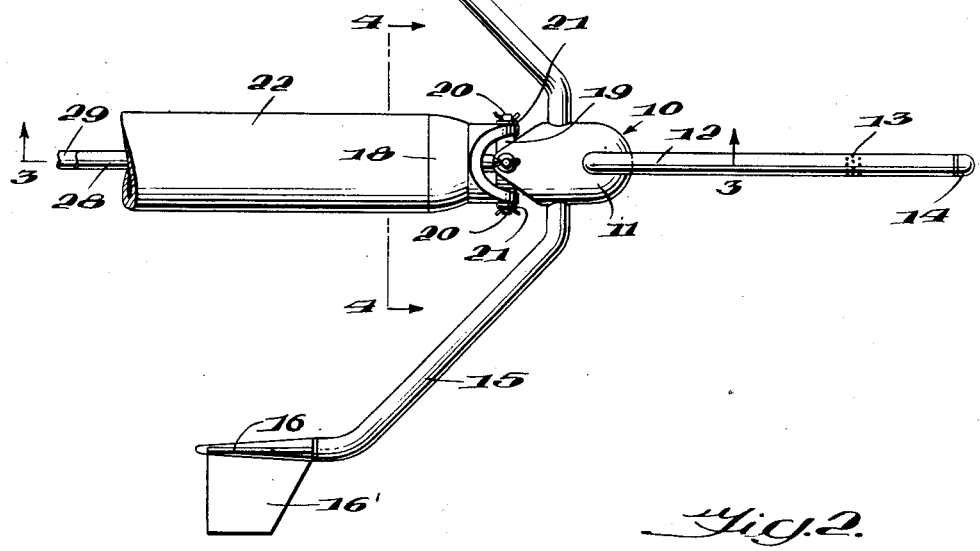
Figure 1 is a plan view of the instrument of this invention.
Figure 2:
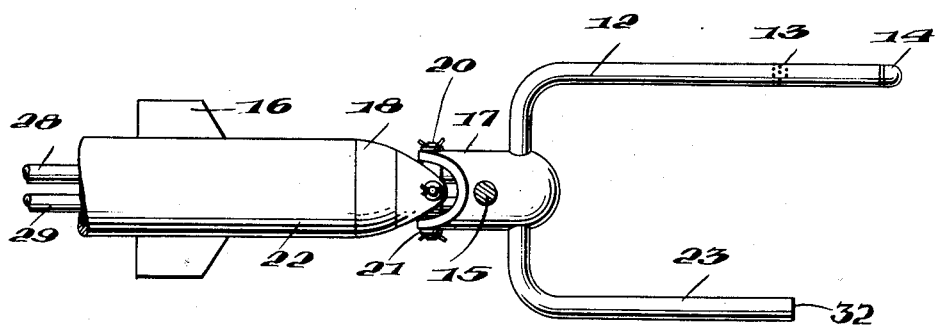
Figure 2 is an elevation view.

Referring more particularly to the drawings, Figure 1 illustrates our invention in its preferred form as a flexible Pitot-static tube or air-pressure pick-up instrument 10 adapted for mounting forwardly of the structure of an aircraft. The instrument 10 is formed with a hollow trunnion mount or base 18 adapted for insertion in the end of a hollow tube or boom 22 having a head 11 flexibly mounted thereon. With this type of base, the instrument 10 is well suited for installation forwardly of the nose or wing section of an aircraft, the correct air speed of which is to be determined. The length of the boom 22 may be varied to suit the particular contour of the aircraft on which it is installed; however, in most cases, it will be found desirable for the boom to be of such length as to place the instrument 10 approximately one chord length ahead of the wing of the aircraft where the flow of air will be relatively undisturbed. The head 11 is formed cylindrical with a rounded nose and a trailing skirt portion cut away complementary to the trunnion mount 18 with oppositely-spaced swivel points 17 as best illustrated by Figure 2. Arranged within the points of the trunnion 18 and swivel points 17 of the head 11 is a universal ring 19 having an apertured center 31 (Figure 5) and four mounting apertures 30 equally spaced around its circumference. Rotatable attachment between the trunnion mount 18 and swivel points 17 of the head 11 with the universal ring 19 at the spaced points is provided for by pins 20 inserted outwardly of the universal ring and held in place by washer and cotter pin assemblies 21. This arrangement of the universal ring 19, which provides for limited swivel movement of the head 11 relative to the oppositely-spaced attaching points of the trunnion 18 and swivel points 17 of the head allows for angular movement of the head relative to the mount in both the horizontal plane and the vertical plane.

The body of the head 11 is formed with oppositely-spaced openings 24 and 26 communicating with the interior of the head by means of nipples 25 and 27 respectively. Inserted within the opening 24 is a static tube 12 contoured to extend the opposite end thereof forwardly of the head 11 in substantially parallel alignment therewith and closed to the entrance of air by a plug 14 inserted therein (Figure 6). Spaced rearwardly from the plugged end of the tube 12 are a plurality of orifices 13 extending through the tube walls at right angles to the centerline of the tube and adapted to admit air at static pressure.

A second or impact tube 23 formed to the same contour as the static tube 12 is inserted in opening 26 formed in head 11 opposite to the static opening 24. The impact tube 23 is formed with an open end 32 extended forwardly and aligned with the axial centerline of the head 11 to receive air under impact pressure as the aircraft by which the instrument is carried moves through the air. Both the static tube 12 and impact tube 23 are formed from stock tubing of the same diameter so as to provide for equal air capacity, but of different lengths. We have discovered that the most practical lengths and spacings of tubes 12 and 23 are that which provide for displacement of the tube ends approximately 60° from each other, measured from the centerline of the straight end portion of the dynamic pressure tube in a plane passing through the centerlines of tubes 12 and 23. This spacing in conjunction with the arrangement of the orifices 13 and closed end 14 of tube 12 tends to minimize the effect of shock wave interference created as the tubes are moved through the air stream at relatively high speed. Communication for passage of air to the indicating instrument (not shown) under static pressure received through orifices 13 into the interior of tube 12 and head 11 through opening 24 is provided for by a flexible tube 28 formed of rubber or like flexible material adapted for insertion over nipple 25 (Figure 3). Like means of communicating air under impact pressure to the indicating instrument is provided for by a second flexible tube 29 inserted over nipple 27 formed in head 11. Both of the flexible tubes 28 and 29 being passed through aperture 31 of the universal ring 19 are capable of bending with the movement of the head 11 without restricting the free transmission of air pressures developed within the static and impact tubes 12 and 23 respectively.

Alignment of the head 11 with the air stream forwardly of the aircraft by which it is carried is attained by means of vertical tail fins 16 and horizontal tail fins 16' mounted at the ends of arms 15 attached at opposite sides of the head to extend outwardly and rearwardly therefrom in a plane substantially perpendicular to the plane passing through the centerline of the static and impact tubes. The length and dimension of the arms 15 and vanes 16, 16' are sufficient to provide for static and dynamic balancing of the instrument so as to preclude any tendency of the instrument to flutter during flight.

The arrangement of the vanes 16, 16' as aerodynamic tail fins with a Pitot-static tube carried by a head 11 universally joined to a base allows for the intake openings of our Pitot-static tube to align properly at all times with the true direction of air flow. This permits the accurate measurement of static and impact pressures in relatively undisturbed air regardless of the angle of pitch or yaw of the aircraft on which the instrument is used to measure air speed.

Although our invention has been shown and described in considerable detail, it will be appreciated that certain changes, alternations, modifications, and substitutions can be made therein without departing from the spirit and scope of the claims.

We claim as our invention:

1. A self-aligning, Pitot-static tube for operation in an air stream comprising a base adapted to be mounted on and forwardly of a supporting structure, a head flexibly carried by said base, air pressure-receiving means carried by said head having orifices opening into and positioned relative to the air stream for receiving air under dynamic and static pressures, a plurality of arms connected to said head diverging laterally and rearwardly therefrom, and aerodynamic aligning fins connected to the rearward end portions of said arms.

2. A self-aligning, air-pressure pick-up instrument for an aircraft comprising a base adapted for mounting on a boom attached to and extended forwardly of the aircraft, an instrument body flexibly mounted on said base and adapted for universal movement relative thereto, air pressure-conveying means carried by said instrument body having spaced air inlets opening into the air stream ahead of the aircraft and adapted simultaneously to receive and convey air at impact and static pressures to a suitable indicator, a plurality of arms connected to said instrument body diverging laterally and rearwardly therefrom, extending along the side of and spaced from said boom, and individual aerodynamic aligning fins connected to the rearward end portions of said arms.

3. An air-pressure pick-up instrument comprising a base mounted on an aircraft, a plurality of tubes supported by said base for universal movement relative to the base, said tubes extending forwardly substantially parallel with and spaced from the centerline of said base, one of said tubes being of the dynamic pressure type and another of said tubes being of the static pressure type, air conduits extending from said tubes through said base, a plurality of arms connected to said tubes diverging laterally and rearwardly therefrom, and individual aerodynamic aligning fins connected to the rearward end portions of said arms.

4. An air-pressure pick-up instrument comprising a base adapted for mounting on a suitable supporting structure, conduits universally mounted on said base having ends extended therefrom for alignment with an air stream, the end of one of said conduits being open to receive air from said air stream under impact pressure with another of the conduits having the end thereof closed to admission of air under impact pressure and orificed at a point spaced rearwardly from said end to admit air into said conduit under static pressure, flexible tubes extending from each conduit through the base for communicating said pressures to a suitable indicating device, a plurality of arms connected to said conduits diverging laterally and rearwardly therefrom, and aerodynamic aligning fins connected to the rearward end portions of said arms to effect alignment of the conduit ends with an air stream.

5. A self-aligning, Pitot-static tube comprising a trunnion mount, a universal ring mounted within the trunnion mount and adapted for limited pivotal movement, a body portion formed with opposed swivel points pivoted to the universal ring at oppositely-spaced points to provide for universal movement of the body relative to the trunnion mount, air pressure-receiving means carried by the body portion having a forward opening positioned to receive air of an air stream under impact pressure and another opening disposed from the first-mentioned opening and adapted to receive air of said air stream under static pressure with communicating passages extending from said openings through the body portion, flexible air-conducting means in communication with said passages and extending through the universal ring and trunnion mount, a plurality of arms connected to said body diverging laterally and rearwardly therefrom, and individual aerodynamic aligning fins connected to the rearward end portions of said arms.

6. A self-aligning pressure pick-up device comprising a trunnion mount, a universal ring pinned to the trunnion mount and adapted to provide limited pivotal movement, a body portion formed with opposed swivel points pivoted to the universal ring at oppositely-spaced points to provide for universal movement of the body relative to the trunnion mount, air pressure-receiving means having a tube attached to the body portion with one end extended forwardly and displaced from the centerline of said body with an open end positioned to receive air of an air stream under impact pressure and a second tube attached to the body portion and extended forwardly thereof with a closed end angularly displaced from the open end of the first-mentioned tube, said second tube being provided with a plurality of orifices formed in the side wall thereof at a point spaced from said closed end and adapted to receive air of said air stream under static pressure, said body portion being formed with communicating passages extending from each tube interiorly of the universal ring and trunnion mount, a plurality of arms connected to said body portion diverging rearwardly and laterally therefrom, and aerodynamic aligning fins connected to the rearward end portions of said arms.

7. A self-aligning pressure pick-up device for use on airplanes and the like comprising a straight, hollow boom heading generally longitudinally parallel into the wind, a trunnion mount rigidly connected to the forward end portion of said boom, a universal ring, mounted within said trunnion mount, adapted for limited pivotal movement, a head having pivotal connection with said universal ring, said head extending beyond said trunnion mount as a pivoting extension in substantially axial alignment therewith having a rounded tip for minimizing drag, a pair of rigid tubes connected to said head substantially 180° apart and extending forwardly and displaced from the centerline of said head, one of said tubes being open at its tip for receiving air under dynamic pressure and the other being closed at its tip with a plurality of orifices formed in the side wall of said tube spaced inboard from said closed tip for receiving air under static pressure, flexible air conducting means extending through said hollow boom and communicating with said tubes, a pair of arms connected to said head diverging laterally and rearwardly therefrom extending along the side of and spaced from said boom having their intersecting plane substantially perpendicular to the intersecting plane of said Pitot tubes, and aerodynamic fins extending from the end portions of said arms providing directional means for guiding said Pitot tubes into the airstream.

8. A self-aligning pressure pick-up device for use on airplanes and the like comprising a straight, hollow boom heading generally longitudinally parallel into the wind, a trunnion mount rigidly connected to the forward end portion of said boom, a universal ring mounted within said trunnion mount, adapted for limited pivotal movement, a head having pivotal connection with said universal ring, said head extending beyond said trunnion mount as a pivoting extension in substantially axial alignment therewith having a rounded tip for minimizing drag, a pair of rigid tubes connected to said head substantially 180° apart and extending forwardly and displaced from the centerline of said head, one of said tubes being open at its tip for receiving air under dynamic pressure and the other being closed at its tip with a plurality of orifices formed in the side wall of said tube spaced inboard from said closed tip for receiving air under static pressure, flexible air-conducting means extending through said hollow boom and communicating with said tubes.

JOSEPH P. PAINE.
ORLEN C. ZAHNOW.

REFERENCES CITED

The following references are of record in the file of this patent:

FOREIGN PATENTS

| Number | Country | Date |
| --- | --- | --- |
| 124,827 | Great Britain | Apr. 10, 1919 |
| 131,333 | Great Britain | Aug. 28, 1919 |
| 299,062 | Italy | July 21, 1932 |